United States Patent

[11] 3,612,548

[72] Inventor Herbert E. Tracy
 Alhambra, Calif.
[21] Appl. No. 880,253
[22] Filed Nov. 26, 1969
[45] Patented Oct. 12, 1971
[73] Assignee Borg-Warner Corporation
 Chicago, Ill.

[54] MECHANICAL SEAL SPRING HOLDER
 4 Claims, 5 Drawing Figs.
[52] U.S. Cl..................................................... 277/74,
 277/41, 277/93
[51] Int. Cl....................................................... F16j 15/16,
 F16j 15/40
[50] Field of Search............................................ 277/38, 39,
 40, 41, 74, 85, 87, 93, 93 SD

[56] References Cited
 UNITED STATES PATENTS
 3,152,808 10/1964 Tankus et al. ................. 277/87 X
 3,250,539 5/1966 Kurz et al. ..................... 277/41

Primary Examiner—Samuel B. Rothberg
Attorneys—Donald W. Banner, William S. McCurry and John W. Butcher ABSTRACT: A mechanical seal assembly of the type having a stationary face and a rotary face forming a sealing interface therebetween, the rotary face being spring-biased toward the stationary face, and including a spring holder having means whereby debris and contaminants which tend to accumulate therein are ejected therefrom as the holder is rotated with the rotary seal.

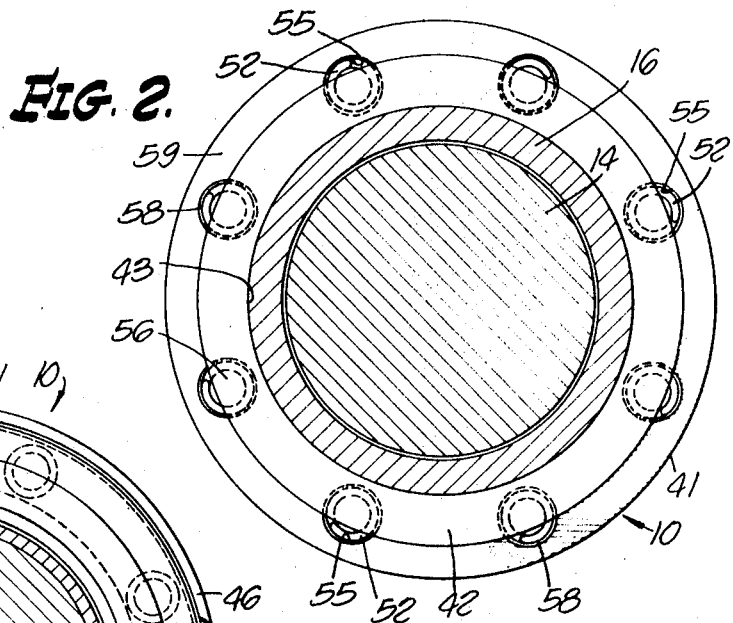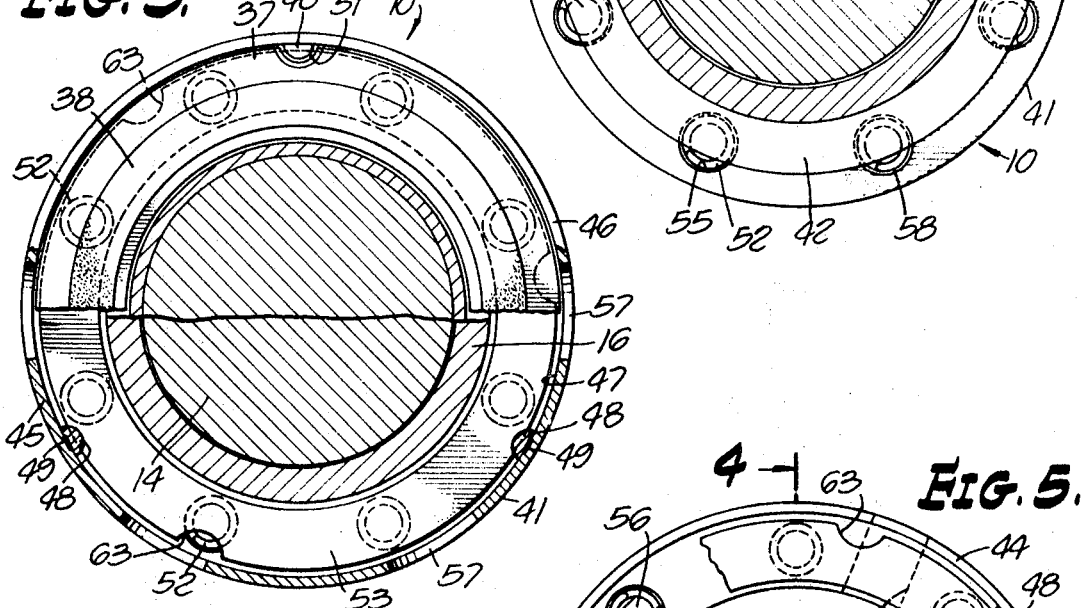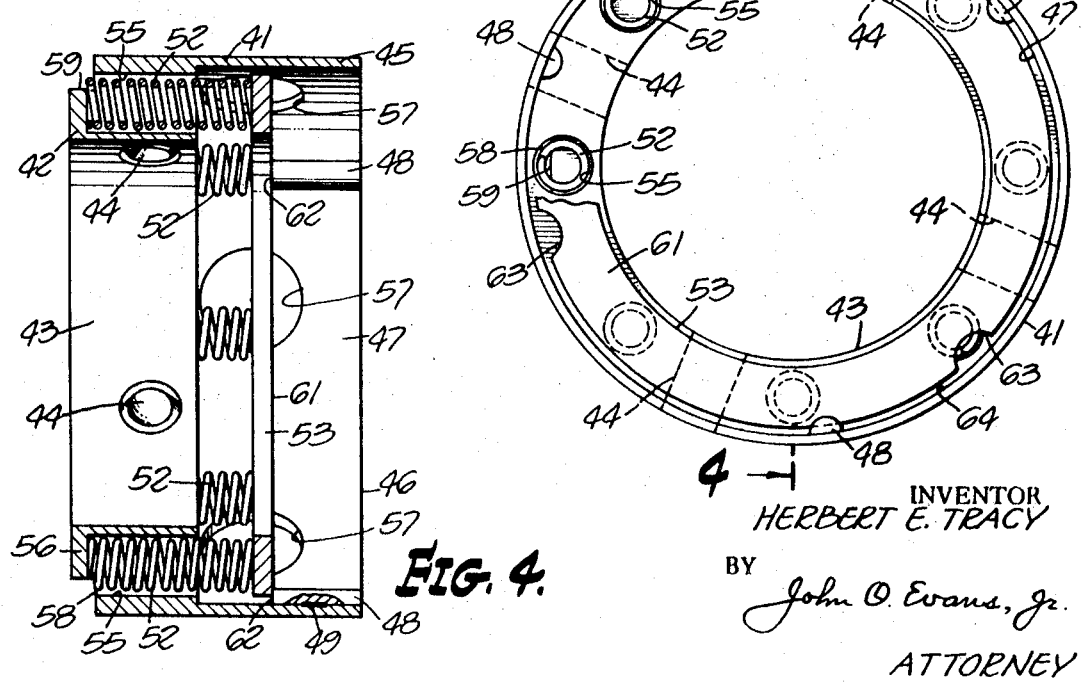

MECHANICAL SEAL SPRING HOLDER

CROSS-REFERENCE TO RELATED APPLICATION

Reference is made to the copending application of Ronald L. Grace and Angel C. Martinez filed concurrently herewith for "Device for Driving and Biasing a Rotary Sealing Ring," which application is assigned to the same assignee as this application. The invention disclosed and claimed in the foregoing Grace et al. application relates to a device for driving a rotary sealing ring mounted on a rotatable shaft and for pressing the ring into cooperative sealing relation with an opposed nonrotary sealing ring. Although such device is also shown and described in this application, since it forms a part of the entire mechanical seal assembly, such device is not my invention, but is the invention of the said Grace et al. and was disclosed to me by them.

BACKGROUND OF THE INVENTION

This invention relates to mechanical seals of the type used for sealing between a housing and a rotating shaft, such seals employing relatively rotating sealing elements which have opposed annular faces lapped to extremely flat finishes in order to provide a fluid seal at the interface of the sealing surfaces. One of the sealing elements or sealing rings is nonrotating and mounted in the housing, the complementary ring being mounted on the shaft or a shaft sleeve for rotation therewith. The rotary ring is biased, as by a spring or springs, for axial movement toward the stationary sealing ring for bringing the complementary faces adjacent to one another to form the annular sealing interface. The springs are carried by a spring holder fixed for rotation with the shaft. One problem which this invention overcomes is the accumulation and entrapment within the spring pockets of the spring holder of deleterious particles or debris which tend to interfere with the efficiency of the springs, with resultant increased requirement for seal maintenance.

SUMMARY OF THE INVENTION

It is one of the objects of this invention to provide a mechanical seal spring holder which at or near the base of the biasing springs has openings at the radially outer periphery of the spring recesses so that accumulated particles and debris may be ejected therefrom as they are propelled outward by centrifugal force.

Another object of the invention is to provide at or near the radially outer area of each spring recess at the base of the recess in the spring holder of the seal, an opening for flow of cooling and lubricating fluid so as to flush out any deleterious particles which tend to accumulate therein.

A further object of this invention is to provide a spring holder which has a series of circularly spaced openings annularly spaced near the outer periphery of its inner cavity, so that on rotation of the holder with the shaft there is a flow of fluid tending to remove particulate material through the holes along with the fluid flowing from the holder.

An additional object of the invention is to provide a spring holder which, at or near the base of the spring recesses, has a portion of its base removed to expose an outer portion of the spring recesses, thereby providing outlets for the expulsion of accumulated debris as the holder rotates, and eliminating blind recesses or pockets where such debris might otherwise collect.

The invention is embodied in a mechanical seal spring holder including: a cylindrical member adapted to be mounted on a shaft, the member having a cylindrical spring pocket positioned eccentrically therein and substantially parallel to the axis thereof, the pocket being open at one end for the reception of a helical spring, the member providing an abutment at the other end of the pocket adapted to support the end of a helical spring received in the pocket; and generally radial fluid passage means for communicating the pocket with the exterior of the member, the fluid passage means intersecting the side wall of the pocket at a location that is adjacent to the other end of the pocket and farthest from the axis of the member.

BRIEF DESCRIPTION OF THE DRAWINGS

FIG. 2 is a transverse sectional view, taken on the line 2—2 of FIG. 1, and looking in the direction of the arrows;

FIG. 3 is a transverse sectional view, taken on the line 3—3 of FIG. 1, and looking in the direction of the arrows;

FIG. 4 is a sectional view, taken on the line 4—4 of FIG. 5 showing a subassembly of the mechanical seal; and FIG. 5 is a right-hand end view of the subassembly shown in FIG. 4.

DESCRIPTION OF THE PREFERRED EMBODIMENT

Figure 1:
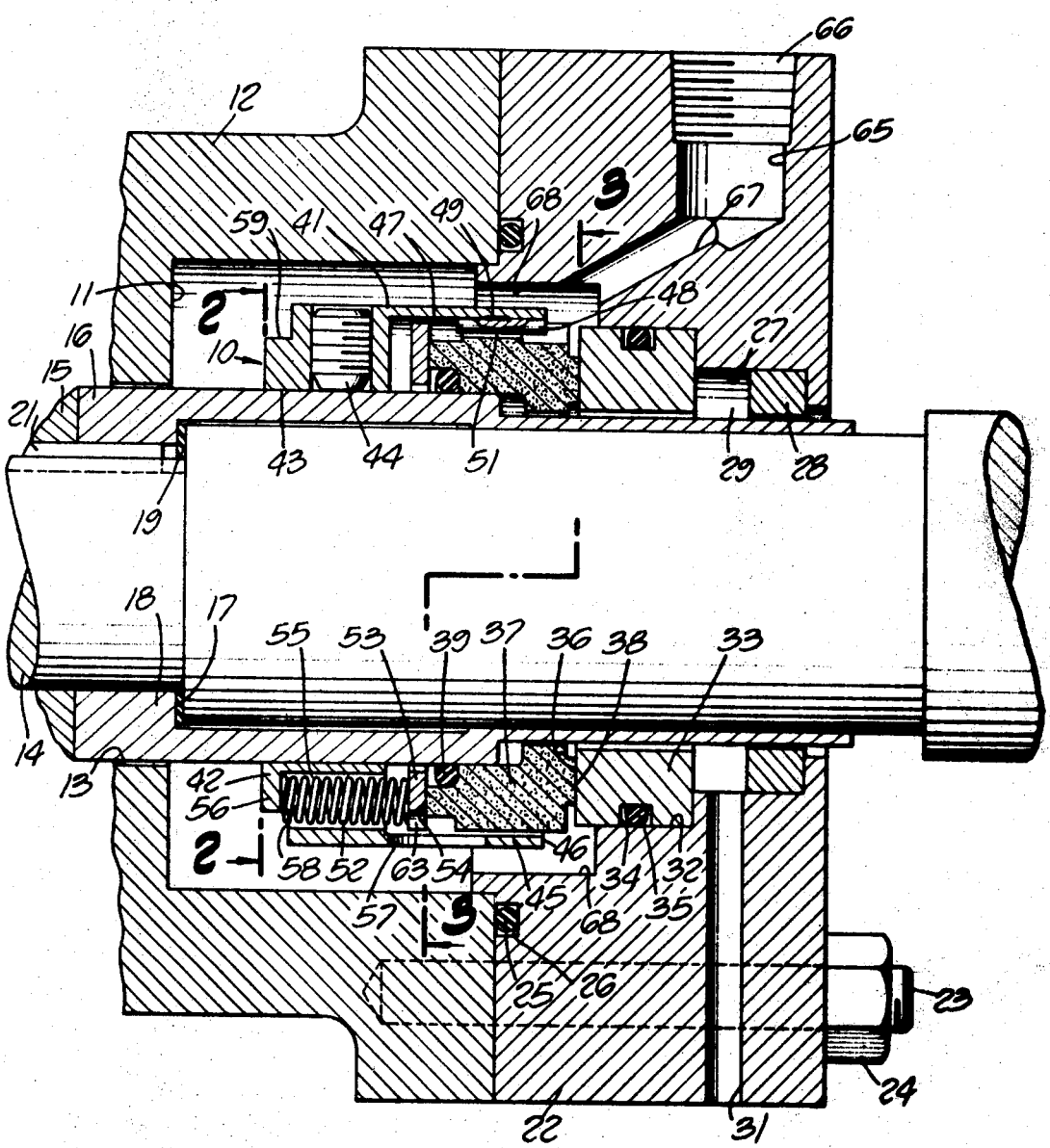
FIG. 1 is a longitudinal cross-sectional view through a pump housing, showing a mechanical seal including a spring holder embodying the invention.

In the drawings, like reference numerals designate the same part in the several views. Referring to the drawings, particularly to FIGS. 1, 2 and 3, the mechanical seal assembly shown is designated by the general reference numeral 10. This mechanical seal assembly is located in a stuffing box 11 formed in the housing 12 of a pump, for example. The stuffing box 11 communicates with the pump's impeller chamber (not shown) through a shaft opening 13. A rotary shaft 14 extends through the shaft opening 13 and through the stuffing box 11, the shaft being driven by a motor outside the housing 12 and driving the pump impeller 15, only a fragment of which is shown.

A shaft sleeve 16 is fitted on the shaft 14, a gasket 17 being interposed between an inturned flange flange 18 on the shaft sleeve and a shoulder 19 on the shaft. The flange 18 of the shaft sleeve is clamped between the shoulder 19 and the impeller 15 to prevent the sleeve from axial movement on the shaft and to compress the gasket 17 to thereby preclude leakage of fluid through the clearance between the shaft sleeve and the shaft. A key 21 locks both the impeller 15 and the shaft sleeve 16 to the shaft so that the impeller and the shaft sleeve rotate with the shaft.

A flange 22 closes the stuffing box 11 at its outer end, the flange being fastened to the housing by fastener means including a stud 23 and a nut 24. Although but one fastening means is shown in FIG. 1, it will be understood that a plurality of such fastening means are used to secure the flange to the housing. Leakage of fluid through the joint between the housing 12 and the flange 22 is prevented by an O-ring 25 received in a groove 26 in the flange and bearing against the housing 12.

The flange 22 has a shaft opening 27 through which the rotary shaft 14 extends. A bushing 28 is fitted into the shaft opening and surrounds the shaft sleeve 16 with a close clearance to provide an annular drainage chamber 29 having a drain passage 31.

Seated in a recess 32 in the flange 22 is a stationary or nonrotary sealing ring 33 formed of a hard material such as tungsten carbide. The stationary sealing ring has a peripheral groove 34 receiving an O-ring gasket 35 that prevents leakage of fluid through the narrow gap between the flange and the stationary sealing ring, and that also frictionally retains the stationary sealing ring in the recess 32. The stationary sealing ring has a radial sealing surface 36 that is lapped to a mirror finish having a high degree of flatness, as is common in the mechanical seal art. Opposing the stationary sealing ring 33 is a rotary sealing ring 37 having a mirrorlike, radial sealing surface 38 opposed to the sealing surface 36 of the stationary sealing ring. The rotary sealing ring is fabricated from carbon, for example.

The rotary sealing ring is mounted on the shaft sleeve 16 for axial sliding movement thereon. An O-ring gasket 39 seals the rotary ring 37 to the shaft sleeve 16 so that fluid under pressure within the stuffing box 11 cannot leak to the exterior through the joint between the rotary sealing ring and the shaft sleeve.

A device is provided for driving or turning the rotary sealing ring with the shaft, and for pressing the rotary sealing ring into cooperative sealing relation with the stationary sealing ring 33. This device includes a spring holder 41 of generally cylindrical form. The spring holder includes a base portion 42 having a bore 43 which allows the spring holder to be mounted on the shaft sleeve 16. The spring holder is locked to the shaft sleeve by set screws 44. The spring holder has a forwardly projecting skirt portion 45 that surrounds the rotary sealing ring 37. Adjacent to the front end 46 of the spring holder, and within the cylindrical cavity 47 of the spring holder are drive keys 48. In the illustrative device shown, three drive keys are employed, these being spaced 120° apart around the skirt portion 45. The drive keys are spot-welded to the skirt portion as shown at 49. These drive keys are received in corresponding drive grooves 51 in the periphery of the rotary sealing ring 37. The spring holder, being locked to the shaft sleeve 16 by the set screws 44, turns with the shaft sleeve and drives the rotary sealing ring 37 through the drive keys 48 engaged in the drive grooves 51.

The means for pressing or resiliently biasing the rotary sealing ring 37 into sealing relation with the stationary sealing ring 33 include a plurality of helical springs 52 that are compressed between the spring holder 41 and a spring retaining washer 53 that abuts the back surface 54 of the rotary sealing ring 37. The springs 52 are carried in cylindrical spring pockets 55 that are provided in the base portion 42 of the spring holder 41 and that are disposed parallel to the axis of the spring holder. The springs fit loosely in the spring pockets. The inner ends of the spring pockets are substantially closed by the back of the spring holder which forms an abutment 56 that supports the inner ends of the helical springs 52.

Fluid circulation holes 57 are provided in the skirt portion 45 of the spring holder. Fluid circulation passages 58 communicate the pockets 55 with the exterior of the spring holder.

As best seen in FIGS. 2 and 4, the circulation passages 58 are formed by first boring the spring pockets 55 and thereafter turning a groove 59 in the outer periphery of the spring holder 41 to intersect the inner ends of the spring pockets 55 at their radially outer portions, i.e. at a location that is adjacent to the inner ends of the pockets and farthest from the longitudinal axis of the spring holder 41. The groove 59 is open to the rear of the spring holder. As best seen in FIG. 2, the groove 59 is machined to a depth such that approximately one-fourth of the inner end of each spring pocket 55 is opened to the exterior of the spring holder. Also as seen in FIG. 4, the groove is cut longitudinally into each of the spring pockets for a slight distance in the axial direction so that the circulation passages 58 connect the inner ends of the pockets with the exterior through fluid passages extending in a generally radially outward direction. Of course, the fluid circulation passages 58 can be formed in other ways, as by chamfering or beveling the spring holder 41 sufficiently to cut into the spring pockets 55. Also, a groove may be machined radially inward from the outer periphery of the spring holder 41 at a location adjacent to the inner ends of the spring pockets but sufficiently far forward to provide a U-shaped groove that is closed to the rear of the spring holder. The term "groove means" is intended to include a chamfer, a bevel cut, an open-end groove, a closed-end groove, or the like.

With circulation passages 58 provided as described herein, blind recesses are eliminated from the spring pockets 55, and debris or suspended material has little or no tendency to collect and build up in the spring pockets to thereby interfere with proper spring action; instead, such debris is easily washed out of the spring pockets and expelled to the exterior of the spring holder 41.

FIGS. 4 and 5 show, as a subassembly, the spring holder 41 with its set screws 44, its helical springs 52, and its spring retaining washer 53. In this subassembly, the spring retaining washer 53 is pressed forward by the springs 52 to a position in which the front surface 61 of the washer abuts the inner ends 62 of the drive keys 48, whereby the washer and springs are retained in the spring holder. As best seen in FIG. 5, the spring retaining washer 53 has openings 63 formed in its radially outer rim. These openings 63 correspond in number to the number of drive keys 48 and are circumferentially displaced from alignment with the keys. However, when the washer is manually rotated relative to the spring holder 41, the openings 63 are brought into axial alignment with the keys 48 and the washer 53 may be moved forwardly past the keys and withdrawn from the cylindrical cavity 47 in the spring holder. The helical springs 52 may then be withdrawn from their respective spring pockets and removed from the subassembly through the open front end of the cylindrical cavity 47. The device of FIGS. 4 and 5 may be reassembled by reversing the foregoing disassembly procedure to provide a mechanical seal subassembly that may conveniently be shipped, handled, and incorporated into a complete mechanical seal with facility.

As shown in FIG. 1, the flange 22 has a radial bore 65 threaded at 66. From this bore, a passage 67 is provided for conducting cooling or lubricating fluid into the cavity 68 that surrounds the front end of the mechanical seal assembly 10. Cooling liquid may be injected through the bore 65 and passage 67 into the stuffing box 11 to maintain the mechanical seal in a cool condition when it is used for sealing hot liquid under pressure inside the housing 12. Some leakage of liquid takes place through the small gap between the cooperating sealing surfaces 36 and 38. This leakage, although small in quantity, serves to lubricate and cool the sealing faces 38 and 36 of the rings 37 and 33. This leakage flows into the annular drainage chamber 29, from which it is exhausted through the drain passage 31.

From the foregoing description, persons ordinarily skilled in the art will understand how the mechanical seal operates, and further description is believed unnecessary. Various changes and modifications may be made in the preferred embodiment without departing from the invention as defined in the claims.

I claim:

1. A mechanical seal spring holder comprising:
   a. an annular cylindrical member having an axial shaft opening therethrough and adapted to be mounted on a shaft, said member providing a plurality of cylindrical spring pockets therein said pockets being disposed substantially parallel to and circularly spaced about the axis of said member, each said pocket being open at one end for the reception of a helical spring, an abutment substantially closing the other end of each said pocket and adapted to support the end of a helical spring received in each said pocket; and
   b. said member providing for each said pocket a generally radial fluid passage communicating said pocket with the exterior of said member, said fluid passage intersecting the sidewall of said pocket at a location that is adjacent to said abutment and farthest from the axis of said member.

2. A mechanical seal spring holder as defined in claim 1 wherein said fluid passage comprises groove means on the exterior of said member intersecting the side wall of each of said cylindrical spring pockets.

3. A mechanical seal spring holder comprising:
   a. an annular cylindrical member having an axial shaft opening therethrough and adapted to be mounted on a shaft, said member providing a plurality of cylindrical spring pockets circularly spaced about the axis of said member and extending substantially parallel to said axis, each said pocket being open at one end with a portion of said member substantially closing the other end, said pocket being adapted to receive a helical spring with one end abutting said portion of said member; and
   b. groove means encircling the outer periphery of said member and intersecting the side wall of each of said spring pockets at a location that is adjacent to the closed end of each pocket to provide for each pocket a generally radially fluid passage communicating each pocket with the exterior of said member.

4. A mechanical seal spring holder as defined in claim 3 wherein said groove means also intersects each of said spring pockets at a radially outer portion of its substantially closed end.

Disclaimer 3,612,548.—*Herbert E. Tracy*, Alhambra, Calif. MECHANICAL SEAL SPRING HOLDER. Patent dated Oct. 12, 1971. Disclaimer filed Mar. 27, 1972, by the assignee, *Borg-Warner Corporation*.

Hereby enters this disclaimer to claims 1 to 4 inclusive, of said patent.

[*Official Gazette July 25, 1972.*]